United States Patent
Agrawal et al.

(10) Patent No.: US 9,674,265 B2
(45) Date of Patent: Jun. 6, 2017

(54) FILTERING UNNECESSARY DISPLAY UPDATES FOR A NETWORKED CLIENT

(71) Applicant: VMware, Inc., Palo Alto, CA (US)

(72) Inventors: Banit Agrawal, Sunnyvale, CA (US); Lawrence Spracklen, Boulder Creek, CA (US); Rishi Bidarkar, Sunnyvale, CA (US); Warren Ponder, Middleton, ID (US)

(73) Assignee: VMware, Inc., Palo Alto, CA (US)

( * ) Notice: Subject to any disclaimer, the term of this patent is extended or adjusted under 35 U.S.C. 154(b) by 738 days.

(21) Appl. No.: 14/071,604

(22) Filed: Nov. 4, 2013

(65) Prior Publication Data

US 2015/0127716 A1 May 7, 2015

(51) Int. Cl.
*G06F 15/16* (2006.01)
*G06F 3/00* (2006.01)
*H04L 29/08* (2006.01)
*G06F 9/44* (2006.01)
*G06F 3/14* (2006.01)

(52) U.S. Cl.
CPC ............ *H04L 67/04* (2013.01); *G06F 3/1454* (2013.01); *G06F 9/4445* (2013.01)

(58) Field of Classification Search
CPC .... G06F 3/1454; G06F 3/1462; G06F 3/1415; G06F 9/4445; G06F 17/30905; H04L 67/08
See application file for complete search history.

(56) References Cited

U.S. PATENT DOCUMENTS

| | | | |
|---|---|---|---|
| 7,106,347 B1 | 9/2006 | Rosenberg | |
| 7,233,336 B2 | 6/2007 | Mondal | |
| 8,127,233 B2* | 2/2012 | McDowell | H04N 19/51 375/240.16 |
| 8,341,624 B1* | 12/2012 | Hobbs | H04N 19/152 709/204 |
| 8,396,122 B1 | 3/2013 | Taylor | |
| 8,453,148 B1* | 5/2013 | Hobbs | G06F 3/1454 718/102 |
| 8,489,704 B1* | 7/2013 | Mendez | G06F 3/1462 709/204 |
| 8,743,954 B1 | 6/2014 | Masterson | |
| 8,774,536 B1* | 7/2014 | Jia | G06F 9/4445 382/232 |

(Continued)

*Primary Examiner* — David Lazaro
*Assistant Examiner* — Julian Chang (57) ABSTRACT

Methods, systems, and computer programs are provided for managing remote display performance. One method includes operations for receiving notifications of events identified by an operating system, and for receiving notifications of display updates destined to a remote display coupled to a remote client. The method includes an operation for correlating events and display updates to determine the transmittal priority for the updates, where the priority is associated with a criticality for presenting the display updates on the remote display. Further, a subset of the display updates are identified as unnecessary for transmission to the remote client based, at least in part, on the priority of the display updates. Additionally, the method includes an operation for performing at least one of: discarding the subset; consolidating the subset into a single display update for transmittal to the remote client; or limiting the frequency of transmission of the subset to the remote client.

20 Claims, 8 Drawing Sheets

(56) References Cited

U.S. PATENT DOCUMENTS

| | | | |
|---|---|---|---|
| 8,902,248 B1 | 12/2014 | Bidarkar | |
| 8,972,893 B2* | 3/2015 | Duncan | G06F 3/048 |
| | | | 715/810 |
| 9,235,313 B2* | 1/2016 | Wu | G06F 3/0481 |
| 2003/0099411 A1 | 5/2003 | Kokemohr | |
| 2004/0098731 A1* | 5/2004 | Demsey | G06F 9/542 |
| | | | 719/328 |
| 2004/0125110 A1* | 7/2004 | Kohda | G06F 3/1462 |
| | | | 345/501 |
| 2004/0205514 A1* | 10/2004 | Sommerer | G06F 17/212 |
| | | | 715/205 |
| 2004/0255276 A1 | 12/2004 | Rovang | |
| 2005/0010861 A1 | 1/2005 | Augustyn | |
| 2005/0124389 A1* | 6/2005 | Yang | H04B 1/1615 |
| | | | 455/574 |
| 2006/0078051 A1 | 4/2006 | Liang et al. | |
| 2007/0009045 A1 | 1/2007 | Mohandas | |
| 2007/0022144 A1 | 1/2007 | Chen | |
| 2008/0155454 A1* | 6/2008 | Balasubramanian | G05B 23/0267 |
| | | | 715/779 |
| 2009/0037774 A1 | 2/2009 | Rideout et al. | |
| 2009/0128491 A1* | 5/2009 | Katayama | G06F 3/038 |
| | | | 345/163 |
| 2009/0153585 A1* | 6/2009 | Mahajan | G09G 5/006 |
| | | | 345/629 |
| 2009/0210817 A1* | 8/2009 | Schmieder | G06F 3/1462 |
| | | | 715/781 |
| 2009/0222739 A1* | 9/2009 | Schmieder | G06F 9/4443 |
| | | | 715/740 |
| 2009/0234940 A1 | 9/2009 | Pat et al. | |
| 2009/0319933 A1* | 12/2009 | Zaika | G06F 3/048 |
| | | | 715/772 |
| 2010/0007788 A1 | 1/2010 | Lee et al. | |
| 2010/0020875 A1 | 1/2010 | Macq | |
| 2010/0064260 A1* | 3/2010 | Amano | G06F 3/14 |
| | | | 715/859 |
| 2010/0161711 A1 | 6/2010 | Makhija et al. | |
| 2010/0162338 A1 | 6/2010 | Makhija | |
| 2010/0290667 A1 | 11/2010 | Lienhart et al. | |
| 2011/0010629 A1* | 1/2011 | Castro | G06F 3/1462 |
| | | | 715/732 |
| 2011/0199389 A1* | 8/2011 | Lu | G06F 3/017 |
| | | | 345/619 |
| 2011/0249572 A1 | 10/2011 | Singhal et al. | |
| 2011/0276900 A1* | 11/2011 | Khan | H04L 67/38 |
| | | | 715/753 |
| 2012/0042252 A1* | 2/2012 | Neerudu | G06F 9/4445 |
| | | | 715/733 |
| 2012/0084774 A1 | 4/2012 | Post et al. | |
| 2012/0206387 A1 | 8/2012 | Omura | |
| 2012/0307074 A1 | 12/2012 | Bhagavathy et al. | |
| 2013/0067331 A1* | 3/2013 | Glazer | H04L 65/1069 |
| | | | 715/719 |
| 2013/0097426 A1 | 4/2013 | Agrawal | |
| 2013/0132971 A1* | 5/2013 | Assuncao | G06F 3/1462 |
| | | | 718/105 |
| 2013/0156100 A1* | 6/2013 | Matsui | H04N 19/12 |
| | | | 375/240.07 |
| 2013/0166629 A1* | 6/2013 | Ivashin | H04L 63/10 |
| | | | 709/203 |
| 2013/0187916 A1* | 7/2013 | Toy | G06T 17/205 |
| | | | 345/420 |
| 2013/0290856 A1* | 10/2013 | Beveridge | G06F 3/1454 |
| | | | 715/740 |
| 2014/0153457 A1* | 6/2014 | Liu | H04W 52/0222 |
| | | | 370/311 |
| 2014/0226901 A1* | 8/2014 | Spracklen | H04N 21/4621 |
| | | | 382/167 |
| 2014/0320673 A1 | 10/2014 | Agrawal | |
| 2015/0009222 A1* | 1/2015 | Diard | G06F 9/45533 |
| | | | 345/505 |
| 2015/0019694 A1* | 1/2015 | Feng | H04L 65/601 |
| | | | 709/219 |
| 2015/0030084 A1 | 1/2015 | Marchya | |
| 2015/0043312 A1* | 2/2015 | Wu | G08C 23/02 |
| | | | 367/197 |
| 2015/0046852 A1* | 2/2015 | Furtwangler | G06F 3/0484 |
| | | | 715/762 |
| 2015/0127716 A1* | 5/2015 | Agrawal | H04L 67/04 |
| | | | 709/203 |
| 2015/0180933 A1 | 6/2015 | Spracklen et al. | |
| 2015/0181207 A1 | 6/2015 | Agrawal et al. | |
| 2015/0186102 A1* | 7/2015 | Yamaguchi | H04L 67/325 |
| | | | 345/2.2 |
| 2015/0194136 A1* | 7/2015 | Diard | G09G 5/393 |
| | | | 345/547 |
| 2015/0312599 A1* | 10/2015 | Brockmann | H04N 21/6125 |
| | | | 725/109 |
| 2016/0073113 A1* | 3/2016 | Rintaluoma | H04N 19/167 |
| | | | 375/240.12 |

\* cited by examiner

Display Update Filtering Rules

| id | Condition | Action/s |
|---|---|---|
| 2 | New window + display update | Throttle 2 display updates per second ... |
| 3 | Mouse click + window decreasing | Combine updates by three |
| 4 | Window moving continuously & ... | Throttle 1:5 ratio for updates |
| 5 | New process for Outlook | Throttle 1:10 for 3 seconds |
| 6 | Notification icon changing fast | Piggiback updates with other updates |
| 7 | | |
| | ... | |

FILTERING UNNECESSARY DISPLAY UPDATES FOR A NETWORKED CLIENT

BACKGROUND

In typical virtualized desktop infrastructure architectures, displays and input devices are local, and applications execute remotely in a server. In Virtual Desktop Infrastructure (VDI) deployments, a user's desktop is typically hosted in a datacenter or cloud, and the user remotely interacts with the user's desktop via a variety of endpoint devices, including desktops, laptops, thin clients, smart phones, tablets, etc. There are many advantages to this approach, including cost savings, improved mobility, easier management and deployment of applications, etc.

Remote display protocols are utilized to transfer the display of a remote desktop to the end-client. As applications executing in the desktop generate changes to the display, the remote display protocol transfers the display data to the remote client. Typically, the user interacts with the desktop via local mouse and keyboard inputs, and these inputs are transferred to the virtual desktop running in the remote datacenter. The keyboard and mouse events are processed and the resulting changes in the display view are sent as display updates to the client.

However, the display view may also change due to other factors, such as the ticking of a clock on a desktop clock. In addition, some display updates are not really important but the resources (e.g., processor, network bandwidth, etc.) utilized to transfer these display updates may be significant.

It is in this context that embodiments arise.

SUMMARY

Embodiments of the present invention provide methods, systems, and computer programs for managing remote display performance. It should be appreciated that the present embodiments can be implemented in numerous ways, such as a process, an apparatus, a system, a device, or a method on a computer readable medium. Several inventive embodiments are described below.

In one embodiment, a method includes operations for receiving notifications of events identified by an operating system, and for receiving notifications of display updates for a remote display that is coupled to a remote client. In addition, the method includes an operation for correlating the events and the display updates to determine the priority of transmittal for the display updates, where the priority is associated with a criticality for presenting the display updates on the remote display. Further, the method includes an operation for identifying a subset of the display updates that is unnecessary for transmission to the remote client based at least in part on the priority of the display updates. The method further includes an operation for performing at least one of: discarding the subset of the display updates; consolidating the subset of display updates into a single display update for transmittal to the remote client; or limiting a frequency of transmission of the subset of the display updates to the remote client. In one embodiment, the operations of the method are executed by a processor.

In another embodiment, a system includes a processor, a memory, and a Network Interface Card (NIC). The memory includes a plurality of programs that include a monitor, an event correlator, and a display update filter. The monitor, when executed by the processor, receives notifications of events identified by an operating system, and receives notifications of display updates for a remote display that is coupled to a remote client. Further, the event correlator, when executed by the processor, correlates the events and the display updates to determine a priority of the display updates, where the priority is associated with a criticality for presenting the display updates on the remote display. In addition, the display update filter, when executed by the processor, identifies a subset of the display updates that is unnecessary for transmission to the remote client based at least in part on the priority of the display updates, where the display update filters further performs at least one of: discards the subset of the display updates; consolidates the subset of display updates into a single display update for transmittal to the remote client; or limits a frequency of transmission of the subset of the display updates to the remote client.

In yet another embodiment, a non-transitory computer-readable storage medium storing a computer program for managing remote display performance is presented. The computer-readable storage medium includes program instructions for receiving notifications of events identified by an operating system, and program instructions for receiving notifications of display updates for a remote display that is coupled to a remote client. Further, the computer-readable storage medium includes program instructions for correlating the events and the display updates to determine a priority of the display updates, where the priority is associated with the criticality for presenting the display updates on the remote display. In addition, the storage medium includes program instructions for identifying a subset of the display updates that is unnecessary for transmission to the remote client based, at least in part, on the priority of the display updates. In addition, the storage medium includes program instructions for performing at least one of: discarding the subset of the display updates; consolidating the subset of display updates into a single display update for transmittal to the remote client; or limiting a frequency of transmission of the subset of the display updates to the remote client.

Other aspects of the embodiments will become apparent from the following detailed description, taken in conjunction with the accompanying drawings, illustrating by way of example the principles of the embodiments.

BRIEF DESCRIPTION OF THE DRAWINGS

The embodiments may best be understood by reference to the following description taken in conjunction with the accompanying drawings in which.

DETAILED DESCRIPTION

Methods, systems, and computer programs are presented for managing remote display performance of a display connected to a remote desktop client. It should be noted, however, that the embodiments may be practiced without some or all of these specific details. In other instances, well known process operations have not been described in detail in order not to unnecessarily obscure the present embodiments.

Embodiments presented herein analyze display updates and determine if some of the display updates are unnecessary, and in this case, lower the impact of the unnecessary display updates by discarding some updates, lowering the frequency of the updates, or combining multiple updates before transmittal. The result is savings in utilization of resources, such as central processing unit (CPU) and network bandwidth.

Figure 1:
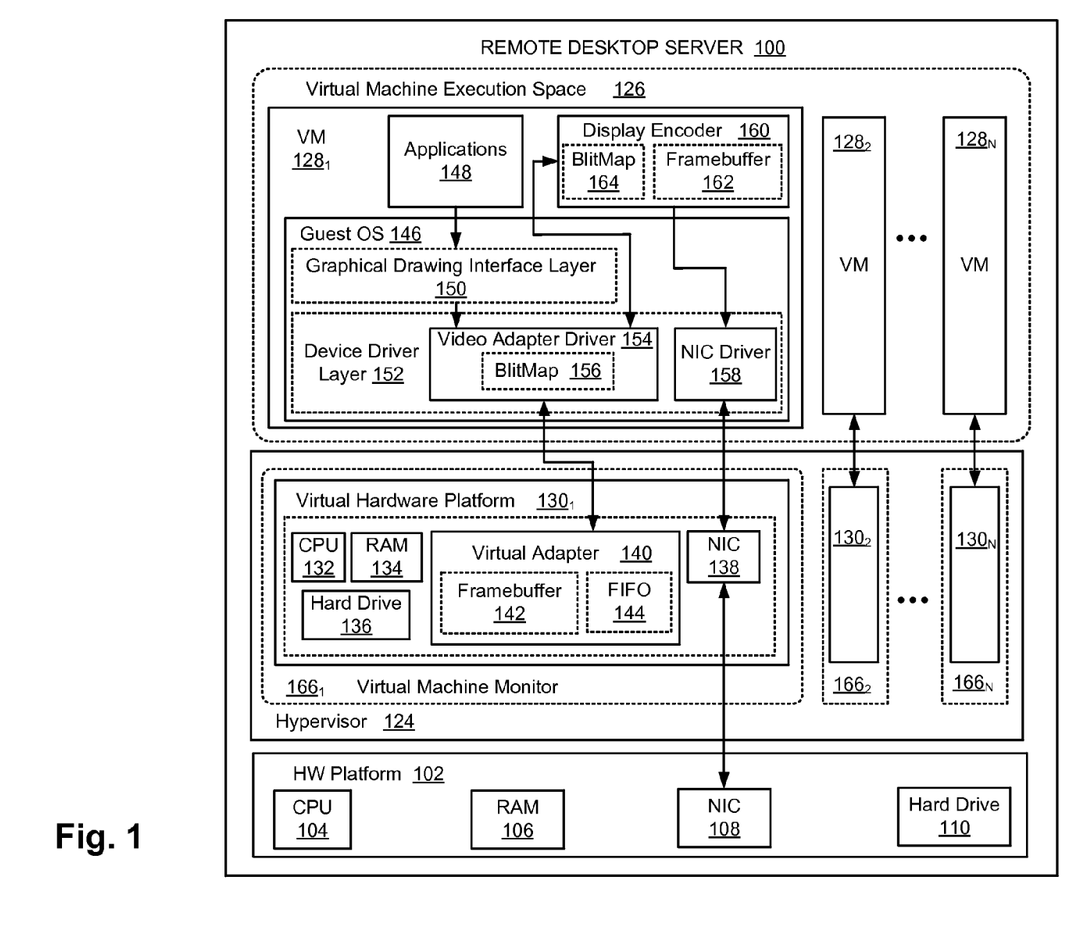
FIG. 1 depicts a block diagram of a remote desktop server according to one or more embodiments of the invention.

FIG. 1 depicts a block diagram of a remote desktop server according to one or more embodiments. Remote desktop server 100 may be constructed on a desktop, laptop, or server hardware platform 102 such as an x86 architecture platform. Such hardware platform may include CPU 104, RAM 106, network adapter 108 (NIC 108), hard drive 110, and other I/O devices such as, for example and without limitation, a mouse and keyboard (not shown in FIG. 1).

A virtualization software layer, also referred to herein as hypervisor 124, is installed on top of hardware platform 102. Hypervisor 124 supports virtual machine execution space 126 where multiple virtual machines (VMs $128_1$-$128_N$) may be concurrently instantiated and executed. In one embodiment, each VM $128_1$-$128_N$ supports a different user who is remotely connected from a different client terminal. For each of VMs $128_1$-$128_N$, hypervisor 124 manages a corresponding virtual hardware platform (i.e., virtual hardware platforms $130_1$-$130_N$) that includes emulated hardware implemented in software such as CPU 132, RAM 134, hard drive 136, NIC 138, and video adapter 140. Emulated video adapter 140 allocates and maintains a framebuffer 142, which is a portion of memory used by video adapter 140 that holds a buffer of the pixel values for refreshing the video display (e.g., "frame"), and a First In First Out (FIFO) buffer 144, which is a portion of memory used by video adapter 140 to hold a list of drawing primitives used to update framebuffer 142. In one embodiment, FIFO buffer 144 is a shared memory buffer that is accessed and shared between video adapter 140 and video adapter driver 154.

Virtual hardware platform $130_1$ may function as an equivalent of a standard x86 hardware architecture, such that x86 supported operating systems, e.g., Microsoft Windows™ Linux™, Solaris™ x86, NetWare, FreeBSD, etc., may be installed as guest operating system (OS) 146 to execute applications 148 for an instantiated virtual machine, e.g., VM $128_1$. Applications 148 that require drawing on a display submit drawing requests through an API offered by graphical drawing interface layer 150 (e.g., Microsoft Windows™ GDI, in one embodiment) which, in turn, converts the drawing requests into drawing commands, and transmits the drawing commands to a video adapter driver 154 in device driver layer 152. As shown in the embodiment of FIG. 1, video adapter driver 154 allocates and maintains a spatial data structure 156, referred to herein as a "blitmap" data structure, that keeps track of potentially changed regions of framebuffer 142 of video adapter 140.

Device driver layer 152 includes additional device drivers such as NIC driver 158, that interacts with emulated devices in virtual hardware platform $130_1$ (e.g., virtual NIC 138, etc.) as if such emulated devices were the actual physical devices of hardware platform 102. Hypervisor 124 is generally responsible for taking requests from device drivers in device driver layer 152 that are received by emulated devices in virtual platform $130_1$, and translating the requests into corresponding requests for real device drivers in a physical device driver layer of hypervisor 124 that communicates with real devices in hardware platform 102.

In order to transmit graphical user interfaces to the display of a remote client terminal, VM $128_1$ further includes a display encoder 160 that interacts with video adapter driver 154 (e.g., through an API) to obtain data from framebuffer 142 for encoding (e.g., to reduce network transmission bandwidth) and subsequent transmission onto the network through NIC driver 158 (e.g., through virtual NIC 138 and, ultimately, through physical NIC 108). Display encoder 160 allocates and maintains a secondary framebuffer 162 for storing data received from framebuffer 142 as well as its own blitmap data structure 164 for identifying changed regions in secondary framebuffer 162. In one embodiment, display encoder 160 continuously polls video adapter driver 154 (e.g., 30 or 60 times a second, for example) to copy changes made in framebuffer 142 to secondary framebuffer 162 to transmit to the remote client terminal.

Those with ordinary skill in the art will recognize that the various terms, layers and categorizations used to describe the virtualization components in FIG. 1 may be referred to differently without departing from their functionality or the spirit of the invention. For example, virtual hardware platforms $130_1$-$130_N$ may be considered to be part of virtual machine monitors (VMM) $166_1$-$166_N$ which implement the virtual system support needed to coordinate operations between hypervisor 124 and corresponding VMs $128_1$-$128_N$. Alternatively, virtual hardware platforms $130_1$-$130_N$ may also be considered to be separate from VMMs $166_1$-$166_N$, and VMMs $166_1$-$166_N$ may be considered to be separate from hypervisor 124. It should further be recognized that embodiments may be practiced in other virtualized computer systems, such as hosted virtual machine systems, where the hypervisor is implemented on top of an operating system.

In some embodiments, VMs $128_1$-$128_N$ communicate with the associated local client over a network using a remote protocol, such as Remote Desktop Protocol (RDP). In one embodiment, the Remote Desktop Protocol is a multichannel capable protocol that supports separate virtual channels for carrying presentation data, serial device communication, licensing information, highly encrypted data (keyboard, mouse activity), etc.

Figure 2:
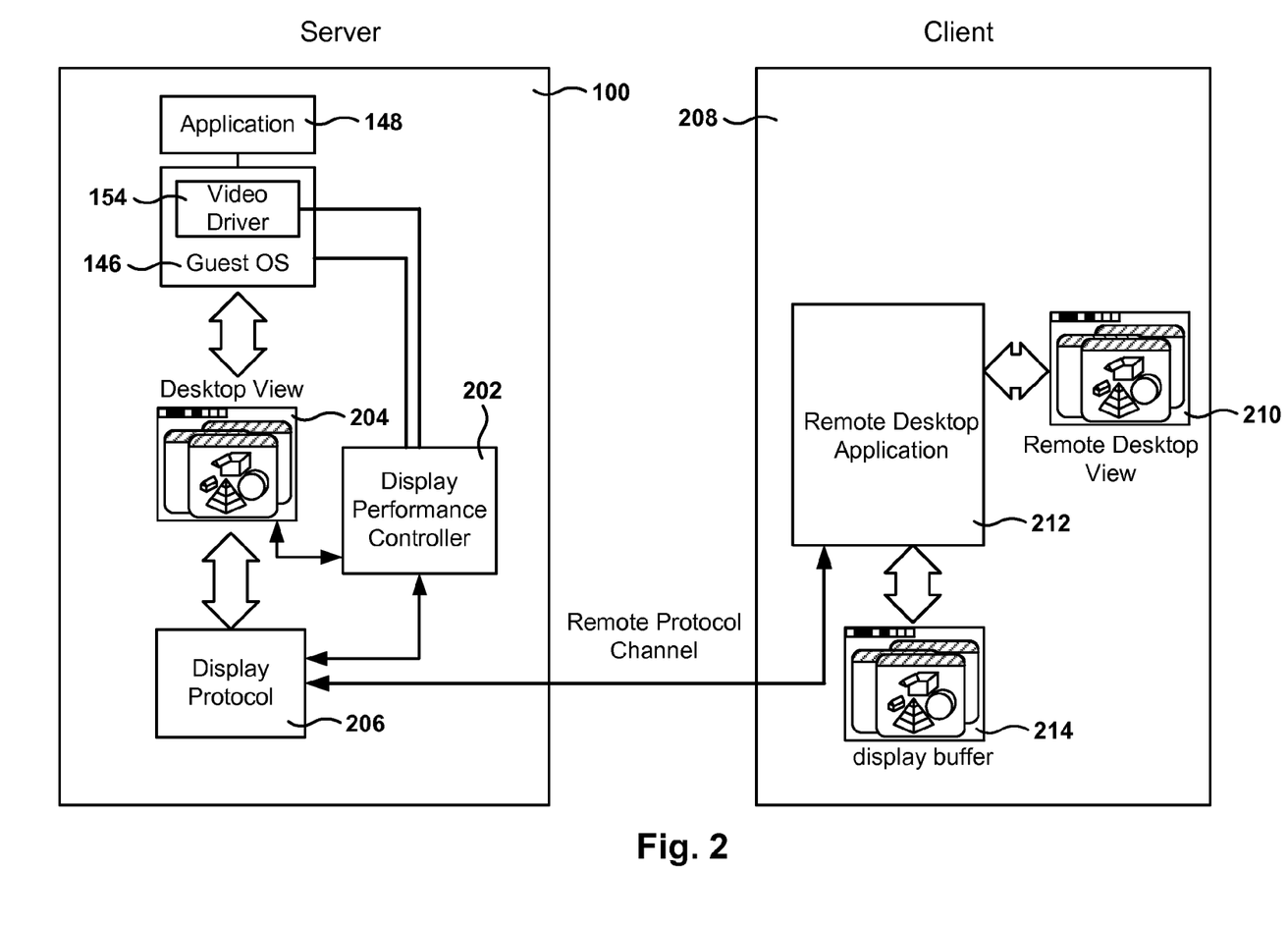
FIG. 2 shows an architecture for managing remote display performance, in accordance with one embodiment.

FIG. 2 shows an architecture for managing remote display performance, in accordance with one embodiment. Sometimes, the display protocol compresses display data before transfer to lower resource use. This compression helps to save resources, but sometimes it is not enough to provide a good customer experience. Some of the updates may be irrelevant or generally perceived as being less important to the end user. These updates are referred to herein as unnecessary updates, and may be eliminated or throttled to lower the number of display updates sent over the network.

In general, a display update is considered unnecessary, when delaying or eliminating the display update does not create a negative perception on the user of the remote display (e.g., it does not lower a user quality perception of remote display rendering). There may be several reasons why a display update may be considered unnecessary. For example, a notifications area on the desktop produces a large amount of display updates (e.g., a clock that counts tenths or hundredths of a second). In this case, sending an update every 100 ms may provide enough quality so the user would not perceive the display as unsatisfactory. Other conditions that may deem a display update unnecessary include: detecting a display update for a windows splash animation (described in more detail below with reference to FIG. 3); detecting that a window on the display is being moved or its size changed; detecting a high frequency of display updates on the same area of the display; detecting that for a first display update, there is a second display update following the first display update for the same area of the display within a predetermined amount of time (e.g., 250 ms, although other values are also possible); detecting a display update for a notifications area on the display, etc.

In one embodiment, a rules engine includes a plurality of rules that identify conditions for determining when display updates are unnecessary. More details are provided below regarding the rule engine with reference to FIG. 4B.

In one embodiment, the display protocol is PC-over-IP (PCoIP), a proprietary remote display protocol developed by Teradici. PCoIP is a UDP based protocol that is host rendered, multi-codec and dynamically adaptive. Images rendered on the server are captured as pixels, compressed and encoded and then sent to the client for decryption and decompression. Depending on the image, different codecs are used to encode the pixels sent since techniques to compress video images differ in effectiveness compared to those for text. The protocol also dynamically adapts its encoding based on the available bandwidth. In low bandwidth environments the protocol utilizes lossy compression where a highly compressed image is quickly delivered, followed by additional data to refine that image, a process termed "build to perceptually lossless." PCoIP is a server-centric protocol because the majority of the graphics rendering and processing is performed on the servers. By transmitting compressed bitmaps or frames, the protocol adjusts in real time to account for the available bandwidth and latency of the communications channel.

Embodiments presented herein determine which display updates are unnecessary updates, and then eliminates, groups, or delays the unnecessary updates. In some embodiments, rendering API calls to video driver 154 made on the VDI desktop by an application 148 are monitored by display performance controller 202 in order to reduce the number of unnecessary updates transmitted over the network.

Initially, a call by application 108 to graphics display API 204 is detected by the display performance application 112. For example, the display API call can be intercepted by display performance controller 202 using known interception techniques, or display performance controller 202 may subscribe to events raised by the operating system when the display API call is made. In one embodiment, the API is provided by the guest operating system (GOS) 146, but the embodiments presented herein may be utilized with any API and any OS. The API call causes a change in the desktop view 204 for the virtual machine.

Display protocol 206 transmits the display updates to the remote desktop application 212 in client 208. In one embodiment, display performance controller 202 controls the display protocol module 206 to eliminate or throttle some of the display updates generated by video driver 154.

At the client 208 side, the remote desktop application 212 receives the display data and updates display buffer 214. The remote desktop application 210 provides the content of the display buffer 214 to a display, which may be integrated with, or connected to, client 208.

When the remote display protocol 206 transfers the display data, the protocol is mainly using two important resources: CPU and network bandwidth. If there are enough resources available, then it may make sense for the display protocol to transfer all the display updates. But oftentimes this is not the case because the physical CPU on the datacenter blade is typically shared across different users and it may be heavily utilized. In addition, the network link is also shared and limited in a WAN environment. Network adaptive compression protocols may alleviate the problem, but this is not enough in many scenarios, such as in the presence of unnecessary display updates, because the protocol would conventionally still need to send the data for these unnecessary updates.

Figure 3:
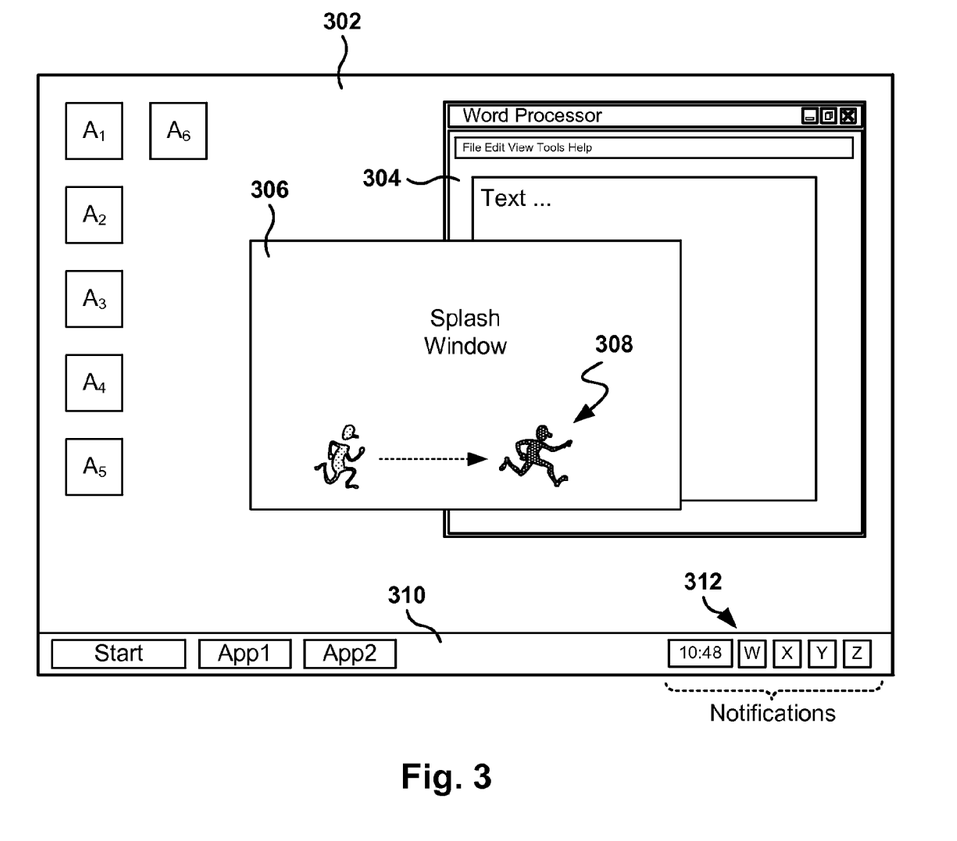
FIG. 3 illustrates a splash window animation when a new window is created, according to one embodiment.

FIG. 3 illustrates a splash window animation when a new window is created, according to one embodiment. FIG. 3 shows a typical desktop display 302. In some embodiments, the desktop display 302 includes shortcuts $A_1$-$A_6$ on the desktop, windows 304 for open applications, a command bar 310, etc. In one embodiment, the command bar 310 includes a start button for accessing OS functions, icons associated with the open windows, and a notification area 312, which has additional icons associated with programs, drivers, or utilities executing on the operating system. In one embodiment, the notifications area 312 also includes a clock showing the time and, optionally, the date.

Upon being started, many applications include what is called a splash window 306, which presents application-related information while the application is being loaded by the operating system. Many times, the splash window 306 includes an animation 308 that does not have much relevance but that keeps the user entertained while the application is being loaded. Also, the animation gives an impression of progress during the loading of the application so the user does not believe that the application is not being loaded. Since these animations are not considered important for user quality perception, display updates related to the splash animations, or at least some of the display updates, are considered unnecessary because they can be eliminated, delayed, or consolidated, etc., without affecting the quality of the remote rendering.

In one embodiment, splash animations are disabled completely or partially in order to save resources. However, sometimes it is better not to completely mask the animation because the splash window shows the progress of the loading of the application, which may be of interest to the user. Therefore, showing progress may be important but progress may be shown with a lower resolution without impacting customer perception. In these cases, throttling display updates is more appropriate.

During the splash window animation display, two things happen: first, the application is being loaded into the system, so new processes are being created in the system; and second, the splash window animation is generating many display updates, mostly at the center of the screen.

The fact that these two types of events are happening simultaneously is used to detect a splash window animation. By looking at a current snapshot of the processes running, and by looking at the region where the display updates are happening, the splash window animation may be detected. It is noted that in some scenarios, it is not possible to detect a display update based on a new window being created on the desktop, because by the time the new window is rendered, the splash animation has already ended.

In one embodiment, a rule engine processes rules that define actions to be taken related to display updates, based on conditions defined in the rules. In other words, each rule includes, at least, one or more conditions and one or more actions that are triggered when the one or more conditions are satisfied.

In one embodiment, the rule condition for the splash-window-animation rule is defined as follows:

Regular display updates are taking place about the center of the screen. In one embodiment, the center of the screen is located at coordinates $(x_c, y_c)$ and the area defined for centered display updates is a rectangle with one corner having coordinates of $(x_c-x_1, y_c-y_1)$ and the opposite corner at $(x_c+x_1, y_c+y_1)$, where $x_1$ and $y_1$ are predefined values that delimit the center area. In one embodiment, $x_1$ and $y_1$ are about ⅛ of the respective horizontal and vertical dimensions in pixels of the display. This means that the dimensions of the central rectangle are about ¼ of the dimensions of the display, and the central rectangle occupies about 1/16 of the display area. However, other values are also possible, and these values may be tuned over time based on the observed behavior of common splash screens;

There is a new process or processes in the list of processes; and

The display updates for the center of the display are being originated by the new process or processes.

In one embodiment, when these rule conditions are met, the display updates are determined to be unnecessary updates and the action performed is to throttle the display updates, i.e., to limit the frequency of display updates sent during a predetermined amount of time (e.g., three seconds, but other values are also possible). In another embodiment, the action requires the elimination of display updates for the center of the screen during a predetermined amount of time. At the end of the predetermined amount of time, one display update is sent that reflects the current value of the pixels in the center area.

In another embodiment, the rules associated with the splash animations also include checking CPU utilization rates. Typically, when a new application is being loaded and the new application creates a new window, the CPU utilization rate spikes up. This temporary high CPU utilization rate may be used as a condition to determine when splash animations may be taking place. For example, in one embodiment a CPU spike of 75% or more may be a factor when considering the detection of the display animation.

In another embodiment, the display updates associated with the notifications area 312 are also managed by the display performance controller. In some operating systems, the operating system provides status updates on a notifications area. The status updates may relate to operating system activities (e.g., a new device has been detected on a USB port) or to events associated with running applications (e.g., a new email has been received). Some applications frequently update their status shown in one of the icons of notifications area 312. Sometimes the icons are updated with a high frequency but with little change of content. In one embodiment, the display updates are throttled (i.e., reduced). Throttling means that some of display updates are combined and transmitted to the client as one display update. For example, groups of five display updates are combined in order to send a single update to the client.

In another embodiment, the display updates are combined by periods of time, and the display updates that take place within one of the periods are sent together as one display update. For example, display updates may be combined and sent every second, every half a second, or every five seconds, etc.

In one embodiment, the rule associated with the control of display updates related to application notifications includes the following condition:

The display updates occur in the lower portion of the application window;

The size of the window where the display updates are taking place is within a predetermined size; and There is a high frame change rate in the region.

Of course, it is noted that the notification area may be in other parts of the screen, or its location may be customized by the user. Therefore, this rule may be adjusted to accommodate for a different location in the desktop of the notification area.

The actions to be taken when the rule is satisfied include one of disabling display updates, limiting the frequency of display updates, grouping display updates to be sent as a single display updates, etc.

Figure 4A:
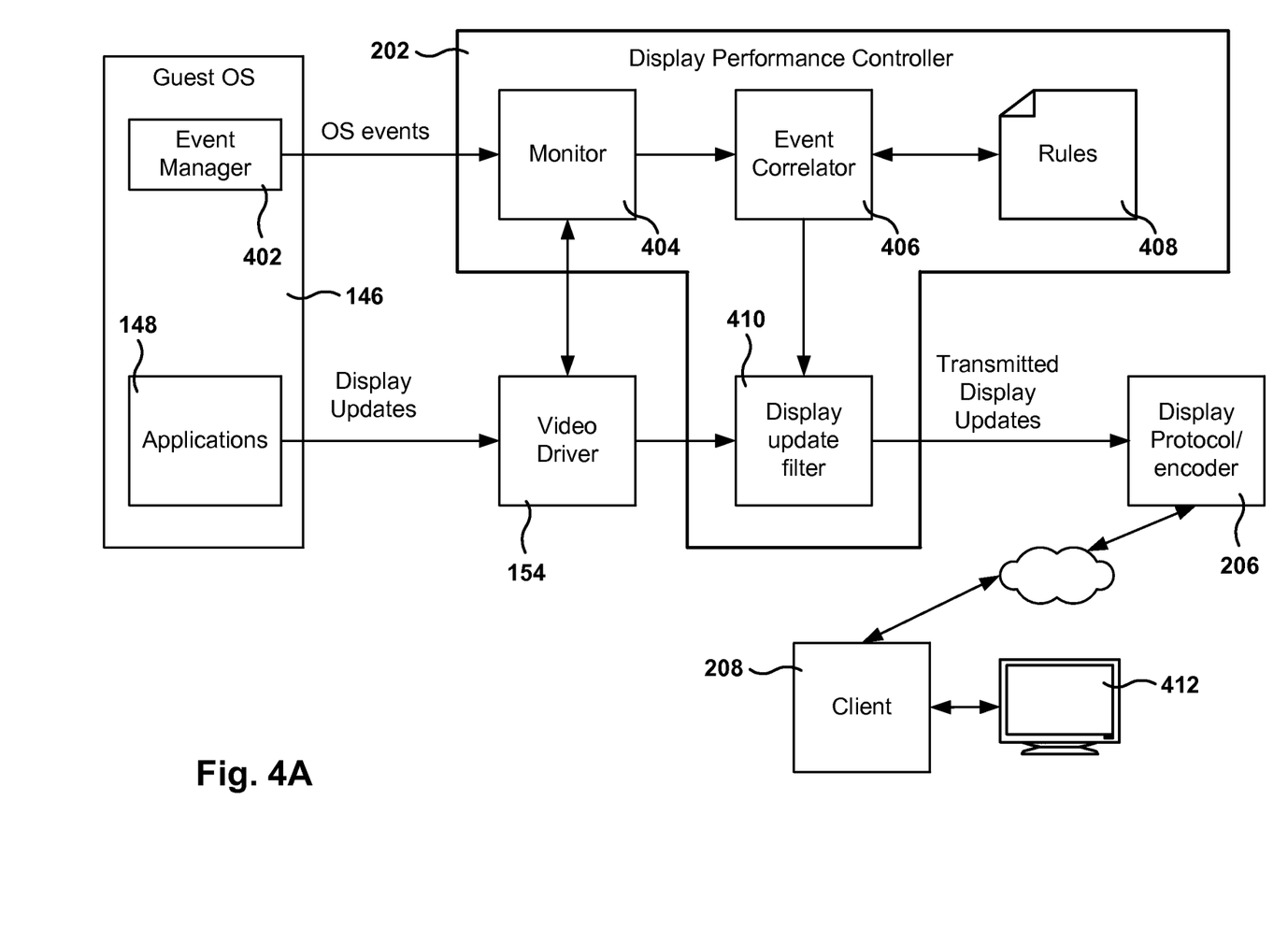
FIGS. 4A-4B illustrate architectures for the management of display-update transmission to a remote client, according to several embodiments.
Figure 4B:
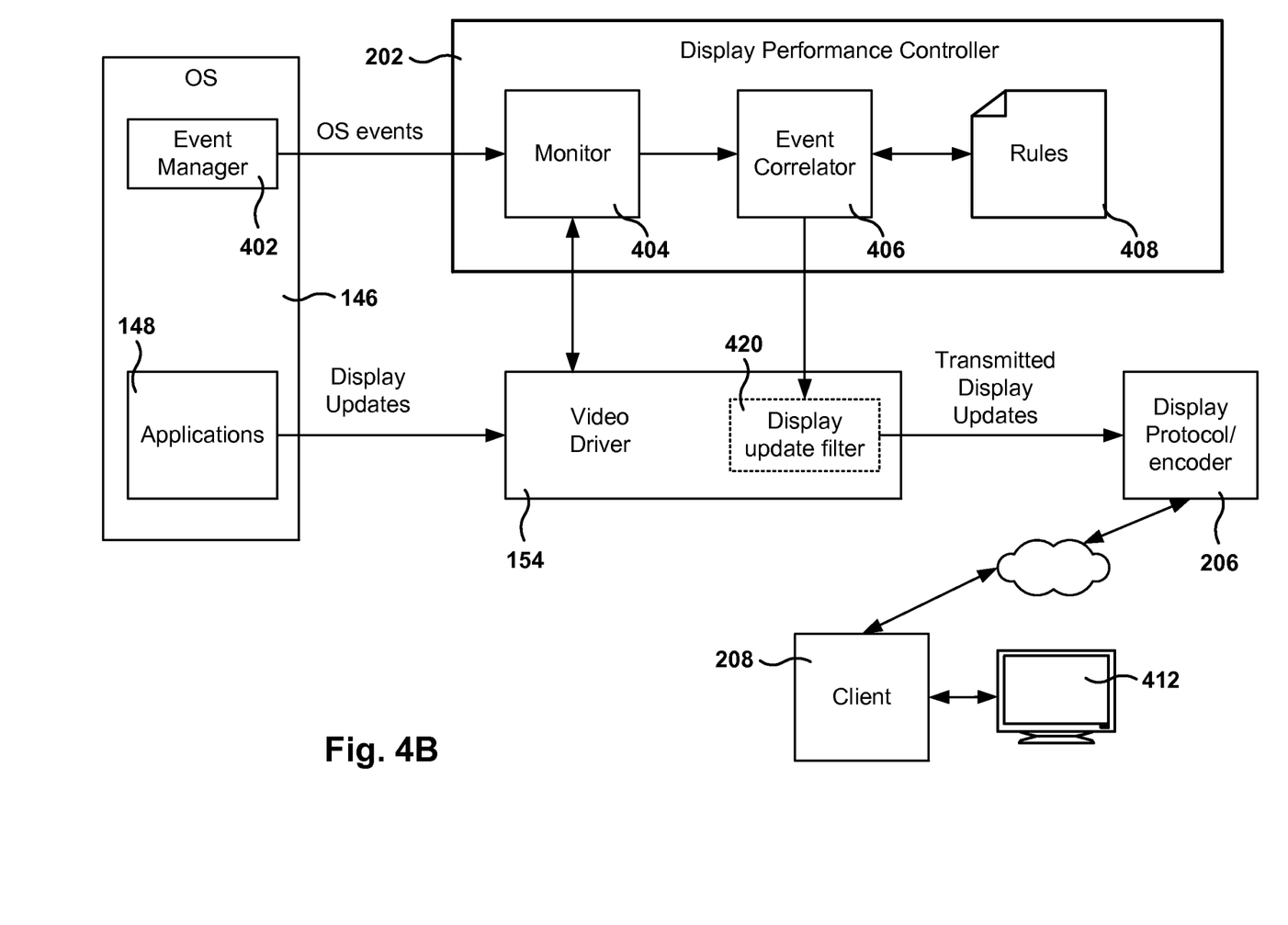

FIGS. 4A-4B illustrate architectures for the management of display-update transmission to a remote client, according to several embodiments. Display performance controller 202 monitors system activities in order to detect unnecessary display updates and to determine actions to be taken when the unnecessary display updates are detected.

In one embodiment, display performance controller 202 includes a monitor 404, an event correlator, 406 and a display update filter 410. In one embodiment, the display performance controller 202 is an application executing in guest operating system 146, and in another embodiment, display performance controller 202 executes in a separate virtual machine or in the hypervisor.

Monitor 404 receives information regarding events in the guest operating system. In one embodiment, monitor 404 subscribes via and API to events provided by events manager 402 in the guest OS. Additionally, monitor 404 interfaces with video driver 154 to detect display updates caused by applications 148 and sent to video driver 154.

In one embodiment, the API to receive events is Windows Management Instrumentation (WMI), which is the infrastructure for management data and operations on Windows-based operating systems. However, any type of API or interface provided by any operating system may be used for event notifications. The events may be transmitted via notifications, or the monitor may poll events manager 402 for events. The events generated by the operating system may include one or more of processes being created or terminated, keyboard inputs, mouse inputs, voice inputs, touch or gesture inputs, Windows operations (e.g., resizing), disk drive access, memory access, etc.

For example, if a new application is launched (e.g., Microsoft Word™, Microsoft Outlook™, etc.) monitor 404 will receive new events associated with the creation of a new process or several processes for the new application. In addition, monitor 404 will detect new display updates via the interface with video driver 154.

One of the functions of the video driver 154 is to identify changes in the pixels of the desktop and determine which display data needs to be transmitted to the remote client. The event correlator 406 receives the information gathered by the monitor 404 regarding events and display updates. The event correlator 406 includes a rules engine 408 with a plurality of rules defined for determining when display updates are deemed unnecessary and can be eliminated or throttled. More details with reference to the different rules are provided below with reference to FIG. 5.

The event correlator 406 assesses current conditions driven by events and display updates, and determines, using the rule engine, actions to be taken on display updates. These actions are implemented by display update filter 410. In one embodiment, display update filter is situated between video driver 154 and display protocol 206, which means that the video driver 154 sends display updates to the display update filter 410, which in turns forwards the display updates to be transmitted to the remote client to the display protocol 206. For example, event correlator 406 may identify a splash animation generated by a new window being created in the desktop because the associated rule has been activated by the rule engine 408.

The display update filter 410 implements the actions determined by the event correlator 406 for the display updates. The event correlator 406 may send commands to display update filter 410 to drop display updates, delay display updates, combine display updates, etc. This way, display protocol 206 only receives updates that are going to be transmitted to the client.

In another embodiment, the display protocol 206 receives all the updates from the video driver 154, but display update filter 410 sends information to the display protocol 206 regarding actions to be performed on the display updates received from the video driver 154.

Display protocol/encoder 206 transmits the display updates to the remote client 208 for presentation in remote display 412, as previously described with reference to FIGS. 1 and 2.

FIG. 4B illustrates another embodiment of an architecture for managing display updates. In this embodiment, the functionality of the display update filter 420 is integrated within video driver 154. Therefore, the video driver receives the display updates from the operating system and the commands from the display performance controller 202, which define actions for limiting or eliminating display updates.

When display performance controller 202 detects that a display update is going to be eliminated or throttled, display performance controller, and in particular event correlator 406, sends a command to display update filter 420 to act on the display update.

It is noted that the embodiments illustrated in FIGS. 4A-4B are exemplary. Other embodiments may utilize different modules, or combine the functionality of several modules into a single module. The embodiments illustrated in FIGS. 4A-4B should therefore not be interpreted to be exclusive or limiting, but rather exemplary or illustrative.

Figure 5:
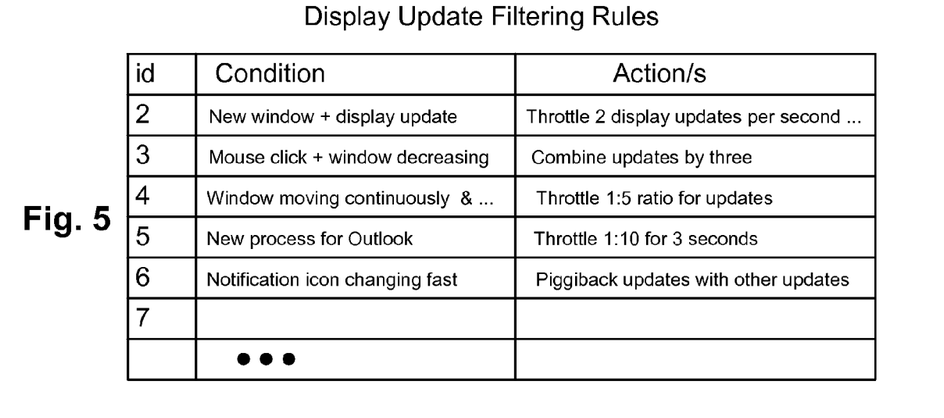
FIG. 5 shows an embodiment of a table describing display-update filtering rules, according to one embodiment.

FIG. 5 shows an embodiment of a table describing display-update filtering rules, according to one embodiment. The rule engine takes inputs, applies intelligent or logic to these inputs (i.e., examines the conditions defined in the rules), and determines the type of events happening in the operating system (e.g., new window being created). In one embodiment, the rule engine analyzes keyboard and mouse inputs, but the rule engine also analyzes other types of inputs, such as new process being created, high-frequency of display updates on a certain region of the display, etc.

In one embodiment, the action for the rule may be triggered when the user performs a double click with the mouse. Although the double click may not be the only condition, it is a strong indicator that changes on the display may take place (e.g., open a file, open an application, display notifications, etc.)

The rule engine utilizes rules that describe different behavior of unnecessary updates. In one embodiment, each rule has, at least, a rule identifier, a condition, and an action. The condition may be triggered by one or more logical checks performed on data related to display updates. As previously discussed, the data that triggers actions may include one or more of a mouse input, a keyboard input, and operating system event, a display update, a new process being created, a window being moved or maximized or minimized or changed in size, a message being received, a new notification being displayed, etc.

A plurality of conditions may be combined utilizing logical operators (e.g., AND, OR, NOT, NOR, XOR, etc.) In addition, a plurality of parameters may be defined in the condition, such as frequency of display updates in a certain region that trigger an exception, frequency of display updates for a given period of time, etc. In one embodiment, one or more rules are based on events originated at the operating system and display updates sent by the video driver, as described above with reference to FIGS. 4A-4B.

Whenever there is a display update, the display performance controller examines the display update, along with one or more of the most recent updates in one embodiment, and some system or process information. The rule engine checks if any of the rules match the current information. If there is a match, then one or more actions associated with the matching rule are executed. Some examples of rules defined in the rule engine relate to splash window animations and frequent updates caused by notification icons, as described above with reference to FIGS. 3.

Sometimes, there may be false positive where some important updates are marked as unnecessary, so the actions defined in the rule engine need not be too stringent to avoid complete elimination of necessary display updates.

In another embodiment, one or more rules are created to control display updates created when a shape of a window in a desktop environment changes. For example, the window may be moved, maximized (i.e., window occupies the whole desktop), minimized (i.e., the window is retired from the desktop), resized, etc.

Typically, when a windows changes shape, the changed is shown right away on the desktop. However, sometimes the graphical user interface (GUI) of the operating system performs animations associated with the changes. For example, the GUI may show the contents of the window while the window moves, or the GUI does a slow animation to shrink a window that has been minimized. In these cases, there may be many transient updates during these operations to change the window shape.

For example, these transient updates may show all intermediate window positions, which consume significant amounts of bandwidth when the updates are transferred to the client side. These transient updates may not mean much to the end-user as these are mostly eye candy animation effects, deemed less important to the end user. Hence, controlling the flow of display updates for these types of operations provides significant CPU and bandwidth savings.

In one embodiment, the condition for a rule to detect display updates caused by window-shape changes is defined as follows:

There is a mouse click event or a keyboard shortcut input to maximize or minimize the current window; and
There is a window continuously increasing or decreasing in size.

When the condition is triggered, the rule may control the display updates associated with the window resize operation, as previously discussed.

It is noted that the embodiments illustrated in FIG. 5 are exemplary. Other embodiments may utilize different types of rule engines, different rules, different operating systems, different operations for changing the displayed view, etc. The embodiments illustrated in FIG. 5 should therefore not be interpreted to be exclusive or limiting, but rather exemplary or illustrative.

Figure 6:
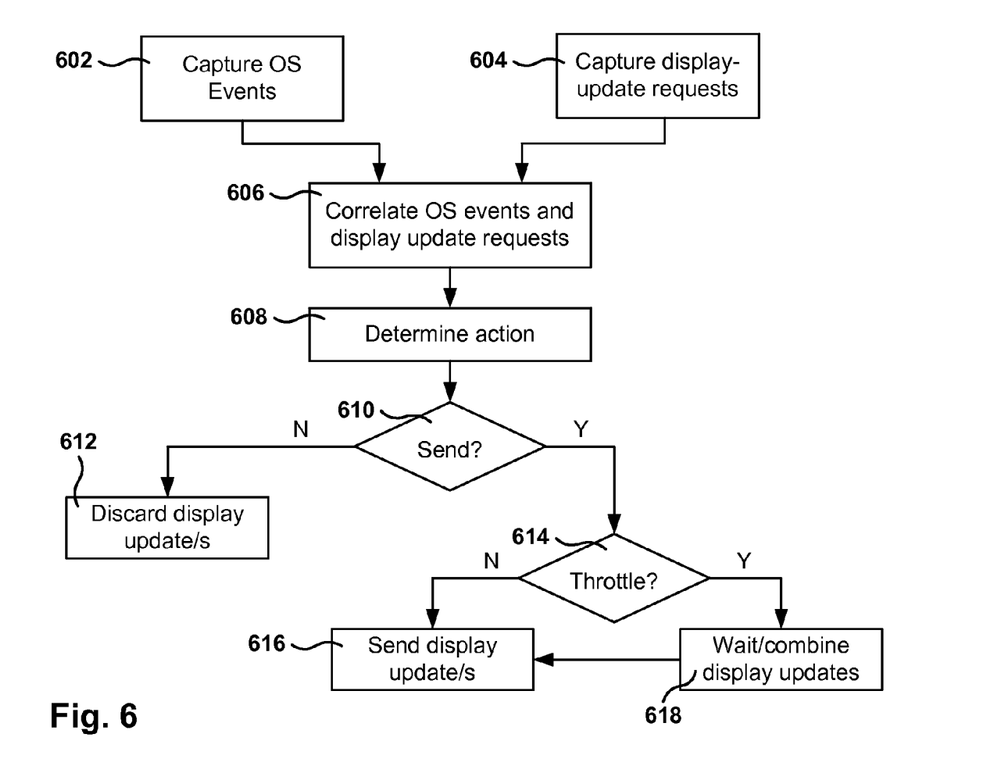
FIG. 6 is a flowchart of a method for managing display-update transmittals, according to one embodiment.

FIG. 6 is a flowchart of a method for managing display-update transmittals, according to one embodiment. While the various operations in this flowchart are presented and described sequentially, one of ordinary skill will appreciate that some or all of the operations may be executed in a different order, be combined or omitted, or be executed in parallel.

In operation 602, events generated by the operating system are captured. In one embodiment, an API provided by the operating system is accessed to allow the monitor to receive or poll for display updates.

In operation 604, the display-update requests are captured or identified. In one embodiment, a change map or blitmap data structure is used to identify which blocks have changed. The blitmap data structure identifies regions within the display view that have changed and need to be updated. Therefore, only display data for the regions identified by the blitmap data structure is sent to the remote display.

In operation 606, the OS events and the display-update requests are correlated to identify unnecessary display updates. In one embodiment, the correlation is performed by a rule engine, as described above with reference to FIGS. 4A, 4B, and 5. From operation 606, the method flows to operation 608 where the action to be performed on the display updates is determined. In one embodiment, the action is determined by the rule triggered by the rule engine.

In one embodiment, filtering unnecessary updates includes two types of actions: completely masking the display updates, and throttling the display updates. While completely masking display updates provides a large benefit in the sense of resource savings, the complete elimination of display updates may be too drastic in case of false positives. Therefore, completely discarding display updates has to be taken carefully. This type of action is only taken in high-confidence detection events.

From operation 608 the method flows to operation 610, where a check is made to determine if the display update is going to be sent based on the determined action in operation 608. If the display update is to be sent, the method flows to operation 614, and if the display update is to be discarded the method flows to operation 612.

In operation 614, a check is made to determine if the display update will be throttled. Throttling at different levels is useful in many scenarios because it lowers the amount of display updates sent to the remote display, while keeping customer perception of display presentation at a satisfactory level.

If the display update is to be throttled, the method flows to operation 618, and if the display update is not to be throttled the method flows to operation 616. In operation 616, the display update or updates are sent to the remote display.

In operation 618, the method waits for a period of time to send several display updates at the same time. A plurality of display updates are combined and sent as a single update to the remote display. For example, a splash screen may last three seconds, and the refresh rate is 25 updates per second. In one embodiment, instead of sending 75 updates for a splash screen lasting 3 seconds, display updates are combined (e.g., in groups of 5) to send a total of 15 updates instead of 75.

Figure 7:
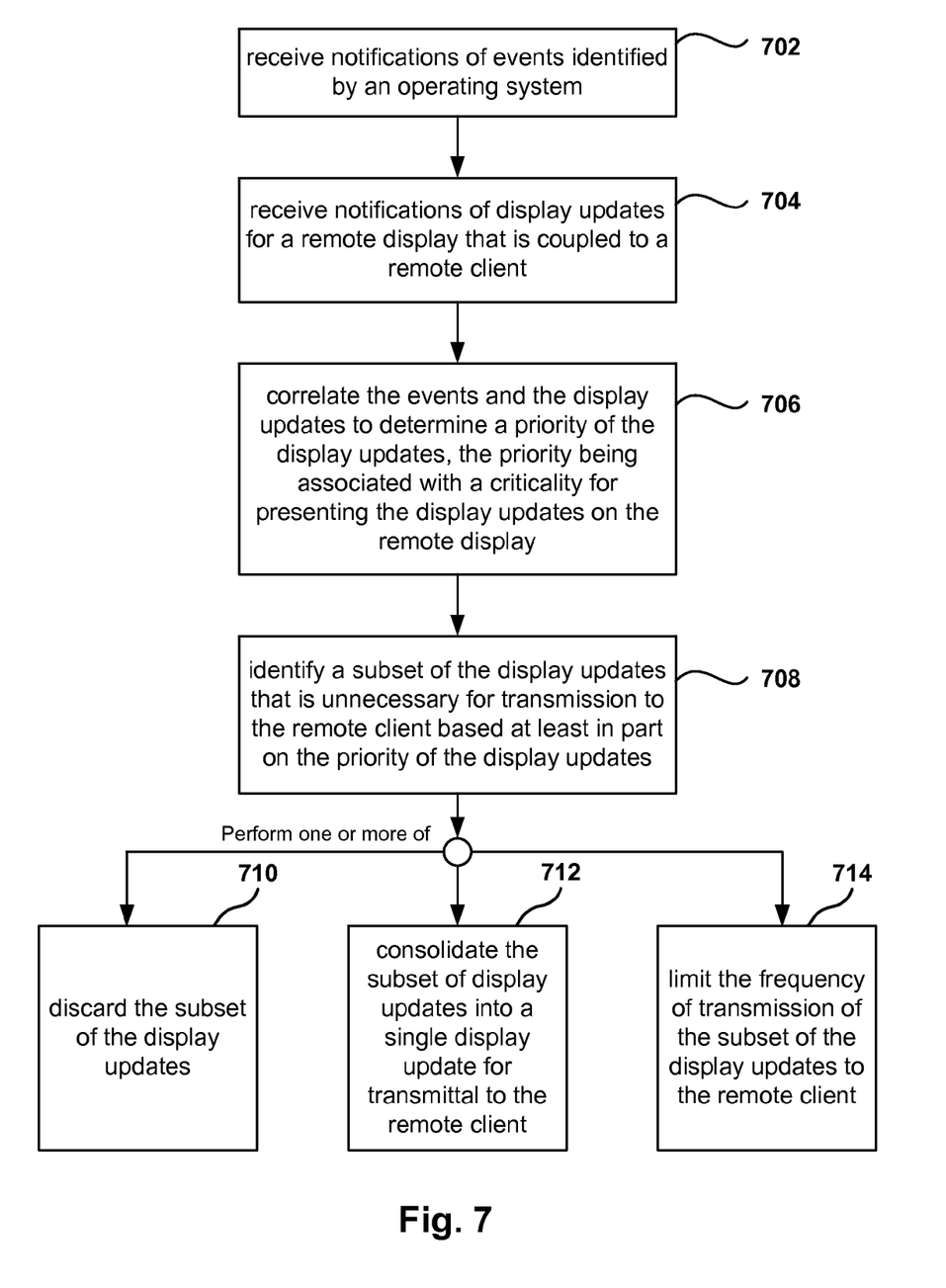
FIG. 7 is a flowchart of a method for managing remote display performance, according to one embodiment.

FIG. 7 is a flowchart of a method for managing remote display performance, according to one embodiment. While the various operations in this flowchart are presented and described sequentially, one of ordinary skill will appreciate that some or all of the operations may be executed in a different order, be combined or omitted, or be executed in parallel.

In operation 702, the monitor receives notifications of events identified by an operating system. From operation 702 the method flows to operation 704, where notifications of display updates for a remote display, which is coupled to a remote client, are received.

From operation 704 the method flows to operation 706, where the events and the display updates are correlated to determine the priority of the display updates. The priority is associated with a criticality for presenting the display updates on the remote display.

A display update may be considered necessary or unnecessary, which provides a Boolean metric regarding the display update. However, some display updates may be considered more necessary or unnecessary than other display updates. In order to compare the value of each display update with regards to quality perception by the user, a priority is assigned to each display update, where the higher the priority, the more "necessary" or "critical" the display update is to provide quality rendering on the remote desktop.

Thus, the priority of a display updates defines the criticality of displaying each display update. The higher the priority, the more critical a display update is. By using the priority metric, it is possible to set a priority threshold, where display updates below the priority threshold are considered unnecessary, while display updates above or equal to the priority threshold are considered necessary updates. In one embodiment, the priority threshold may be adjusted based on perceived customer satisfaction when different priority thresholds are tested. In another embodiment, the priority threshold may be adjusted when certain conditions are met, such as when system resources become low, or when network bandwidth is low.

From operation 706 the method flows to operation 708, where the method identifies a subset of the display updates that is unnecessary for transmission to the remote client based at least in part on the priority of the display updates. From operation 708, the method performs at least one operation from operations 710, 712, and 714.

In operation 710, the subset of the display updates is discarded. Further, in operation 712, the subset of display updates is consolidated into a single display update for transmittal to the remote client. In operation 714, the method limits the frequency of transmission of the subset of the display updates to the remote client.

Figure 8:
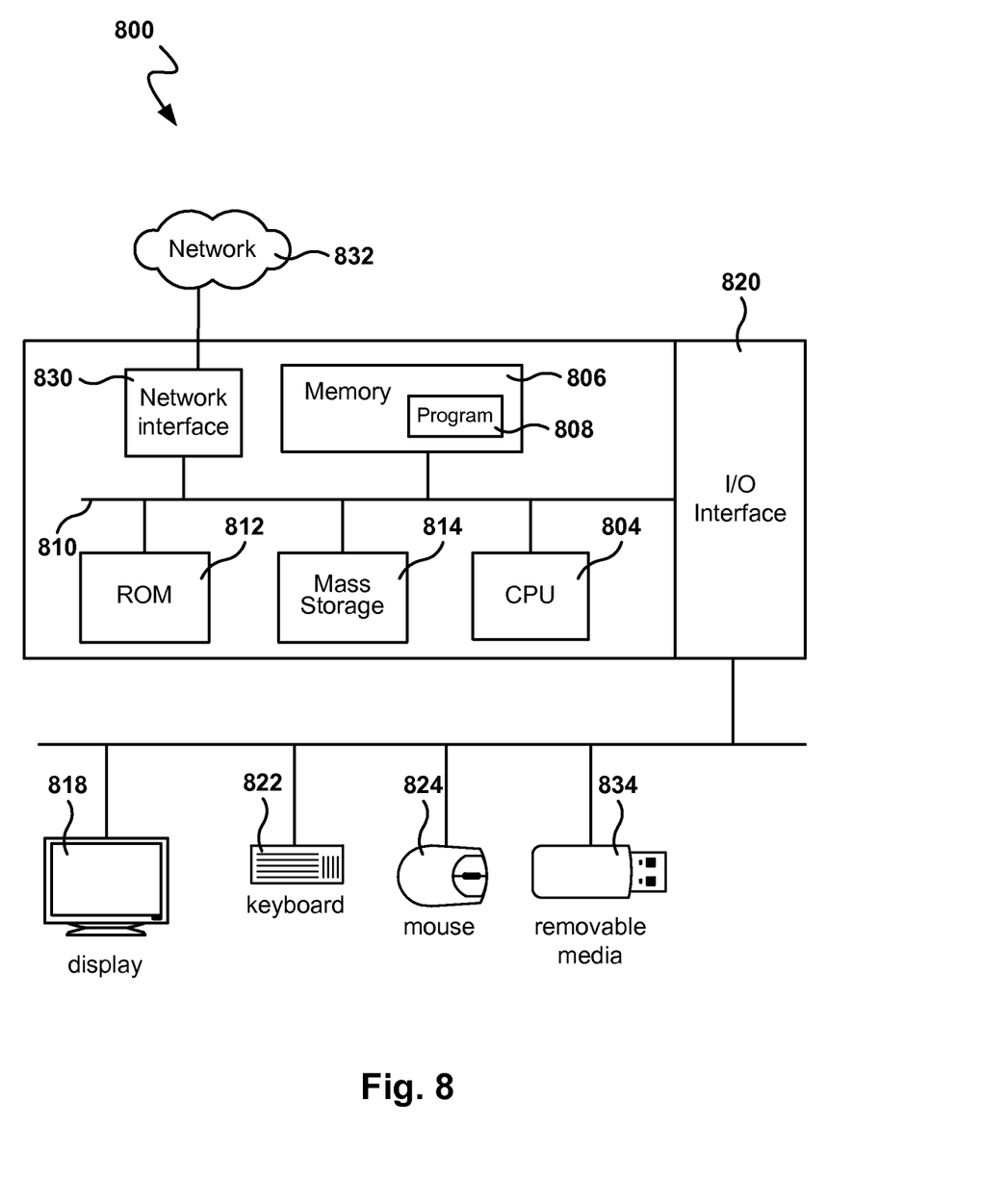
FIG. 8 is a simplified schematic diagram of a computer system for implementing embodiments presented herein.

FIG. 8 is a simplified schematic diagram of a computer system for implementing embodiments presented herein. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 804, which is coupled through bus 810 to random access memory (RAM) 806, read-only memory (ROM) 812, and mass storage device 814. Program 808 resides in random access memory (RAM) 806, but can also reside in mass storage 814. Program 808 may include a display performance controller program, such as the one in FIG. 4A.

Mass storage device 814 represents a persistent data storage device such as a floppy disc drive or a fixed disc drive, which may be local or remote. Network interface 830 provides connections via network 832, allowing communications with other devices. It should be appreciated that CPU 804 may be embodied in a general-purpose processor, a special purpose processor, or a specially programmed logic device. Input/Output (I/O) interface provides communication with different peripherals and is connected with CPU 804, RAM 806, ROM 812, and mass storage device 814, through bus 810. Sample peripherals include display 818, keyboard 822, cursor control 824, removable media device 834, etc.

Display 818 is configured to display the user interfaces described herein. Keyboard 822, cursor control 824, removable media device 834, and other peripherals are coupled to I/O interface 820 in order to communicate information in command selections to CPU 804. It should be appreciated that data to and from external devices may be communicated through I/O interface 820.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

The methods, systems and embodiments are not limited to any one brand of server or virtualization servers. In one embodiment, a hypervisor partitions physical servers to host multiple virtual machines. Each virtual machine may represent a complete system, with processors, memory, networking, storage and BIOS. The hypervisor enables multiple virtual machines to: (a) share physical resources, (b) run unmodified operating systems and applications, and (c) run the most resource-intensive applications side by side on the same server. Other hypervisors may have similar functionality or more or less functionality. Accordingly, the systems, methods and computer readable media can be practiced using any product, software, or hardware configuration.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for managing remote display performance, the method comprising:
   receiving notifications of events identified by an operating system;
   receiving notifications of display updates for a remote display that is coupled to a remote client;
   correlating the events and the display updates to determine a priority of the display updates, the priority being associated with a criticality for presenting the display updates on the remote display, wherein correlating the events and the display updates includes detecting that the display updates are caused by an application that generates a splash animation on a display;
   identifying a subset of the display updates associated with the splash animation that is unnecessary for transmission to the remote client based at least in part on the priority of the display updates; and
   performing at least one of:
      discarding the subset of the display updates associated with the splash animation;
      consolidating the subset of display updates associated with the splash animation into a single display update for transmittal to the remote client; or
      limiting a frequency of transmission of the subset of the display updates associated with the splash animation to the remote client.

2. The method as recited in claim 1, wherein identifying a subset of the display updates that is unnecessary further includes:
   identifying a first display update as unnecessary when the first display update satisfies one or more conditions, the conditions being selected from a group consisting of the first display update is for a splash animation, or the first display update is for moving a window on a graphical user interface, or the first display update exceeds a frequency threshold for updating a predefined area of the display, or a second display update for a same area of the display as the first display update follows the first display update within a predetermined amount of time, or the display update is for a notifications area on the display.

3. The method as recited in claim 1, wherein correlating the events and the display updates further includes:
   determining if the received events and received display updates match any rule from a plurality of rules; and
   performing an action defined in a rule that has been matched, wherein the action defines controls for reducing the number of display updates.

4. The method as recited in claim 1, wherein correlating further includes:
   identifying that a new window is being created based on the events; and identifying a splash animation associated with the creation of the new window, wherein a number of display updates associated with the splash animation is reduced.

5. The method as recited in claim 1, wherein the correlating further includes:
   identifying that a new window is being created based on the events; and
   determining that the new window is being created by an application that generates splash animations on the display, wherein a number of display updates associated with the splash animation is reduced.

6. The method as recited in claim 1, wherein the correlating further includes:
   detecting a mouse click or a keyboard input that changes a size of a window in the display; and
   detecting that the window generates display updates for increasing or decreasing the size of the window, wherein a number of display updates transferred over the network associated with change in size of the window is reduced.

7. The method as recited in claim 1, wherein the correlating further includes:
   detecting display updates for a region of the display associated with operating system status updates, wherein a number of display updates associated with the display updates for the region is reduced.

8. The method as recited in claim 1, wherein receiving notifications of display updates further includes:
   monitoring display updates originated by applications sending requests to a video driver in the operating system.

9. The method as recited in claim 1, wherein receiving notifications of events further includes:
   utilizing application programming interface (API) functions to receive the notifications of events, wherein the API is provided by the operating system.

10. The method as recited in claim 1, wherein the remote client is associated with a virtual machine executing on a server.

11. The method as recited in claim 1, wherein correlating the events in the display updates further includes:
    assigning a low priority to display updates whose elimination does not lower a user quality perception of remote display rendering; and
    assigning a high priority to display updates whose elimination would lower the user quality perception.

12. A system for managing remote display performance, the system comprising:
    a processor;
    a memory having a plurality of programs that include an operating system, a monitor, an event correlator, and a display update filter; and
    a network interface card (NIC), wherein the monitor, when executed by the processor, receives notifications of events identified by the operating system, and receives notifications of display updates for a remote display that is coupled to a remote client;
    wherein the event correlator, when executed by the processor, correlates the events and the display updates to determine a priority of the display updates, the priority being associated with a criticality for presenting the display updates on the remote display, wherein the event correlator is configured to detect the display updates that are caused by an application that generates a splash animation on a display;
    wherein the display update filter, when executed by the processor, identifies a subset of the display updates associated with the splash animation that is unnecessary for transmission to the remote client based at least in part on the priority of the display updates, wherein the display update filter further performs at least one of:
       discards the subset of the display updates associated with the splash animation;
       consolidates the subset of display updates associated with the splash animation into a single display update for transmittal to the remote client; or
       limits a frequency of transmission of the subset of the display updates associated with the splash animation to the remote client.

13. The system as recited in claim 12, further including:
    a video driver, wherein the monitor interfaces with the video driver to receive the notifications of the display updates.

14. The system as recited in claim 12, wherein the memory further includes a plurality of rules for determining the priority of the display updates, each rule including a condition and one or more actions to be executed when the condition is met.

15. The system as recited in claim 12, wherein the display update filter interfaces with a video driver to control display updates transmitted from the video driver to a display protocol encoder.

16. The system as recited in claim 12, wherein the display update filter is embedded within a video driver.

17. A non-transitory computer-readable storage medium storing a computer program for managing remote display performance, the computer-readable storage medium comprising:
    program instructions for receiving notifications of events identified by an operating system;
    program instructions for receiving notifications of display updates for a remote display that is coupled to a remote client;
    program instructions for correlating the events and the display updates to determine a priority of the display updates, the priority being associated with a criticality for presenting the display updates on the remote display, wherein correlating the events and the display updates includes detecting that the display updates are caused by an application that generates a splash animation on a display;
    program instructions for identifying a subset of the display updates associated with the splash animation that is unnecessary for transmission to the remote client based at least in part on the priority of the display updates; and
    program instructions for performing at least one of:
       discarding the subset of the display updates associated with the splash animation;
       consolidating the subset of display updates associated with the splash animation into a single display update for transmittal to the remote client; or
       limiting a frequency of transmission of the subset of the display updates associated with the splash animation to the remote client.

18. The computer program as recited in claim 17, wherein identifying a subset of the display updates that is unnecessary further includes:
    program instructions for identifying a first display update as unnecessary when the first display update satisfies one or more conditions, the conditions being selected from a group consisting of the first display update is for a splash animation, or the first display update is for moving a window on a graphical user interface, or the first display update exceeds a frequency threshold for updating a predefined area of the display, or a second display update for a same area of the display as the first display update follows the first display update within a predetermined amount of time, or the display update is for a notifications area on the display.

19. The computer program as recited in claim 17, wherein correlating the events in the display updates further includes:
   program instructions for determining if the received events and received display updates match any rule from a plurality of rules; and
   program instructions for performing an action defined in a rule that has been matched, wherein the action defines controls for reducing the number of display updates.

20. The computer program as recited in claim 17, wherein correlating further includes:
   program instructions for identifying that a new window is being created based on the events; and
   program instructions for identifying a splash animation associated with the creation of the new window, wherein a number of display updates associated with the splash animation is reduced.

* * * * *